United States Patent
Martin et al.

(10) Patent No.: US 9,242,641 B2
(45) Date of Patent: Jan. 26, 2016

(54) DYNAMIC ALLOCATION OF DRIVE TORQUE

(71) Applicant: Ford Global Technologies, LLC, Dearborn, MI (US)

(72) Inventors: Douglas Raymond Martin, Canton, MI (US); Ted Haladyna, Northville, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 14/018,289

(22) Filed: Sep. 4, 2013

(65) Prior Publication Data

US 2015/0066265 A1    Mar. 5, 2015

(51) Int. Cl.
| | |
|---|---|
| *B60D 1/64* | (2006.01) |
| *B60W 20/00* | (2006.01) |
| *B60W 50/08* | (2012.01) |
| *B60W 10/06* | (2006.01) |
| *B60W 10/08* | (2006.01) |
| *B60W 30/188* | (2012.01) |
| *B60K 6/445* | (2007.10) |
| *B60W 50/00* | (2006.01) |

(52) U.S. Cl.
CPC ............. *B60W 20/108* (2013.01); *B60W 10/06* (2013.01); *B60W 10/08* (2013.01); *B60W 20/10* (2013.01); *B60W 20/1082* (2013.01); *B60W 30/1882* (2013.01); *B60W 50/082* (2013.01); *B60W 50/085* (2013.01); *B60K 6/445* (2013.01); *B60W 2050/0088* (2013.01); *B60W 2540/04* (2013.01); *B60W 2540/10* (2013.01); *B60W 2540/106* (2013.01); *B60W 2710/0666* (2013.01); *B60W 2710/083* (2013.01); *Y10S 903/902* (2013.01)

(58) Field of Classification Search
USPC .......................................................... 701/70
See application file for complete search history.

(56) References Cited

U.S. PATENT DOCUMENTS

| | | | |
|---|---|---|---|
| 6,247,448 B1 | 6/2001 | Scholl et al. | |
| 7,960,928 B2 * | 6/2011 | Tang ..................... | B60L 15/025 318/400.02 |
| 7,967,720 B2 | 6/2011 | Martin et al. | |
| 8,306,720 B2 * | 11/2012 | Yamazaki .............. | B60K 6/445 123/520 |
| 8,423,217 B2 | 4/2013 | Kojima et al. | |

FOREIGN PATENT DOCUMENTS

EP    1990524 A1    11/2008

* cited by examiner

*Primary Examiner* — Thomas G Black
*Assistant Examiner* — Ana Thomas
(74) *Attorney, Agent, or Firm* — David Kelley; Alleman Hall McCoy Russell & Tuttle LLP

(57) ABSTRACT

Methods and systems are provided for dynamically allocating engine torque and motor torque in a hybrid vehicle to meet operator torque demand. The allocation is adjusted by constraining the maximum engine torque allowable under selected conditions to provide a better trade-off between performance and fuel economy. A maximum engine torque that provides best fuel economy is learned during engine operation at different engine speed-load conditions based on a deviation in spark retard torque ratio from a threshold ratio as spark timing is moved to MBT.

20 Claims, 7 Drawing Sheets

|  | Performance mode | Economy mode | |
|---|---|---|---|
| Steady-state conditions | Max torque for best fuel economy | Max torque for best fuel economy | |
| Transient conditions | Max torque for best vehicle performance | Max torque for best fuel economy (If motor Tq < max Tq) | Max torque for best vehicle perf. |

FIG. 5

DYNAMIC ALLOCATION OF DRIVE TORQUE

TECHNICAL FIELD

The present application relates generally to dynamic allocation of maximum engine torque in a hybrid electric vehicle to improve fuel economy.

BACKGROUND AND SUMMARY

In some vehicles, such as hybrid vehicles, a high level system controller may control a plurality of power and/or torque sources for propelling the vehicle. For example, the controller may allocate a total drive request among the various sources in different ways depending on operating conditions. During the allocation, a vehicle controller may consider one or more factors such as the available output range of the individual torque sources. For example, an engine may have a variable maximum torque output depending on operating conditions, and it may further change as the engine ages, etc.

One example approach for dynamic torque allocation is shown by Martin et al. in U.S. Pat. No. 7,967,720. Therein, the maximum torque allowed for the engine is adjusted during vehicle operation based on vacuum demand for various conditions, such as for fuel vapor purging. Specifically, when there is insufficient vacuum for purging a fuel canister, the maximum engine torque is limited to a level that provides the required purge vacuum. The remaining operator torque demand is then allocated to the hybrid vehicle electric motor.

However the inventors herein have identified a potential issue with such an approach. The adjusting of maximum engine torque to meet vacuum demand can result in too much limiting of the maximum torque, which hurts fuel economy. As such, it may be difficult to trade-off best fuel economy and maximum engine performance. The setting for best performance will have a maximum engine torque in the borderline spark reduction region, which is inefficient and degrades fuel economy. On the other hand, operating at a lower maximum engine torque that is at MBT spark under all conditions sacrifices engine performance and is not optimally efficient when not operating at worst case conditions. Additional variability in fuel octane rating, and engine internal conditions (such as in-cylinder temperature, compression, deposits, knock detection, etc.) make it more difficult to accurately form an open-loop prediction of the highest maximum torque available when spark is at or near MBT.

In one example, the above issue may be at least partly addressed by a method for a hybrid electric vehicle comprising: dynamically limiting a maximum available torque for an engine based on each of an operator selected vehicle performance mode and a change in torque demand, the maximum available torque limited between a first torque limit based on performance and a second torque limit based on fuel economy; and providing motor torque to the vehicle based on the dynamic limiting. In this way, a better balance can be struck between engine performance and fuel economy.

For example, in response to an operator pressing an "ECO" button of a vehicle, a fuel economy mode of vehicle operation may be selected. Accordingly, the settings of various engine operating parameters may be adjusted so as to improve fuel economy while minimizing reduction in performance when fuel economy is the priority. In particular, a maximum available engine torque may be limited. The constrained maximum available engine torque may be learned (e.g., learned up or learned down) during engine operation, at different engine speed ranges, based on a spark retard torque ratio (that is, a ratio of maximum engine torque at borderline spark relative to maximum torque at MBT). The learned maximum engine torque may allow the most torque to be extracted from the engine without entering an inefficient state. The constrained maximum engine torque may be applied when operating in the economy mode both during steady-state as well as transient conditions. In comparison, when the "ECO" button is not actuated, and a normal mode is selected where vehicle performance is of priority, the constrained maximum engine torque may be applied only when operating in steady-state conditions. During transient conditions, an unconstrained maximum engine torque may be used, at the cost of a small fuel penalty, to allow vehicle accelerations to be improved.

In this way, changing environmental and engine conditions are better accounted for and the best available engine torque is available for vehicle performance while still delivering the best fuel economy. By dynamically the degree of limiting of the maximum engine torque, and the allocation of a drive torque between an engine torque and a motor torque, a more aggressive use of the available engine is possible. In addition, a smaller, less costly battery can be used to achieve equivalent vehicle performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a table depicting the maximum engine torque limits applied at different performance modes and under different changes in torque demand.

DETAILED DESCRIPTION

Figure 1:
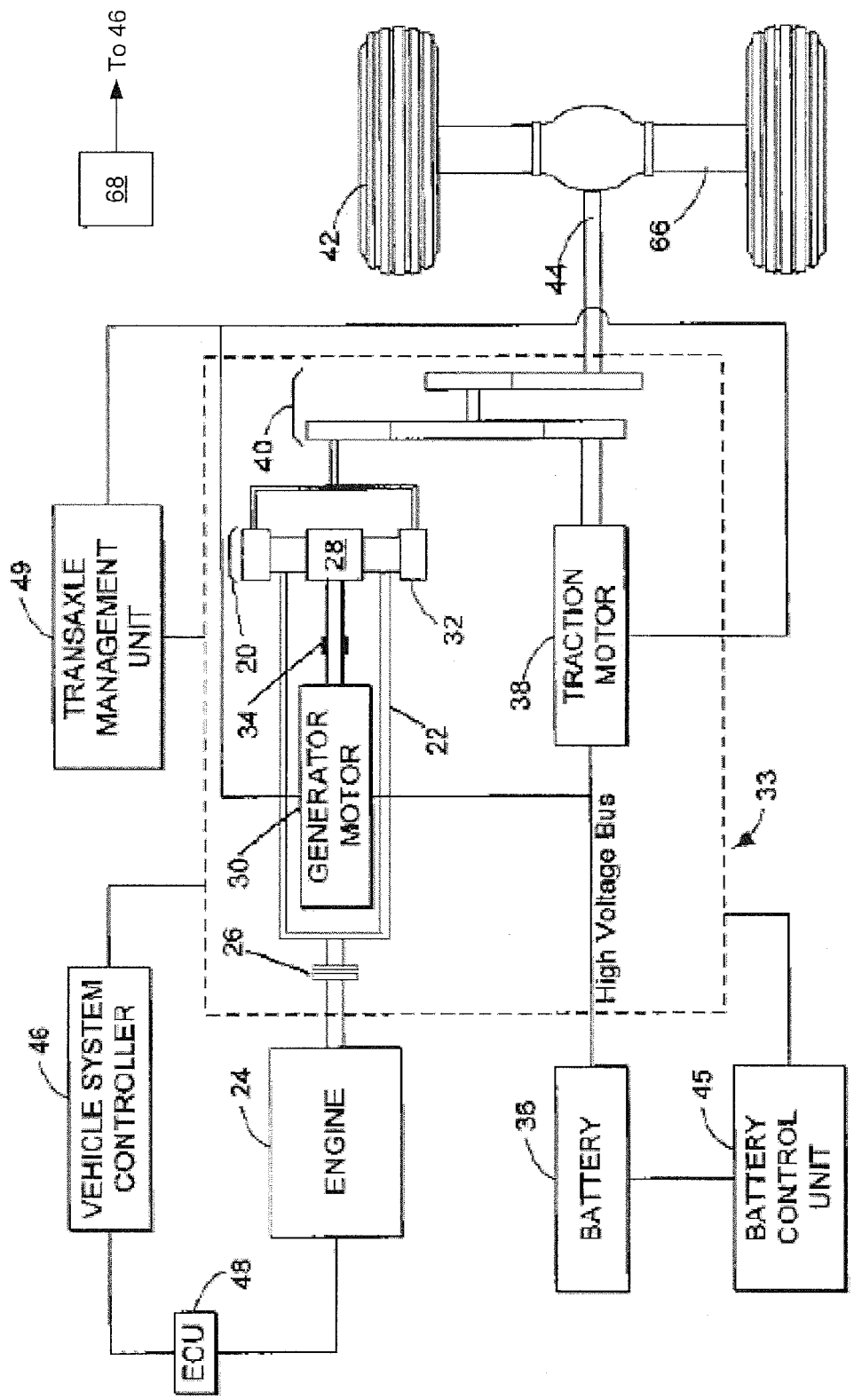
FIG. 1 is a schematic diagram of an engine in an example hybrid powertrain of a hybrid electric vehicle.
Figure 2:
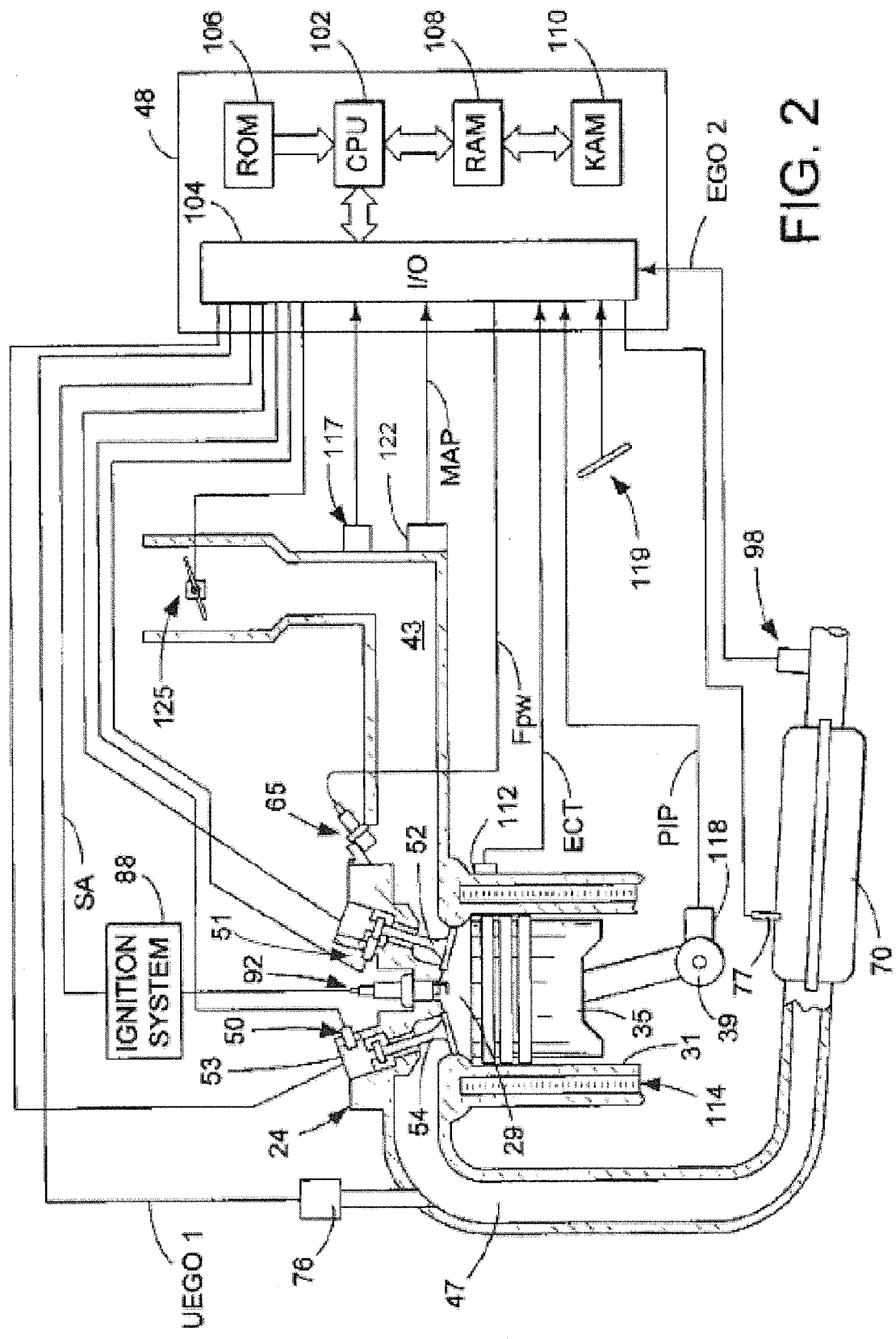
FIG. 2 is a schematic diagram of an engine, intake system, and exhaust system of the vehicle of FIG. 1.
Figure 6:
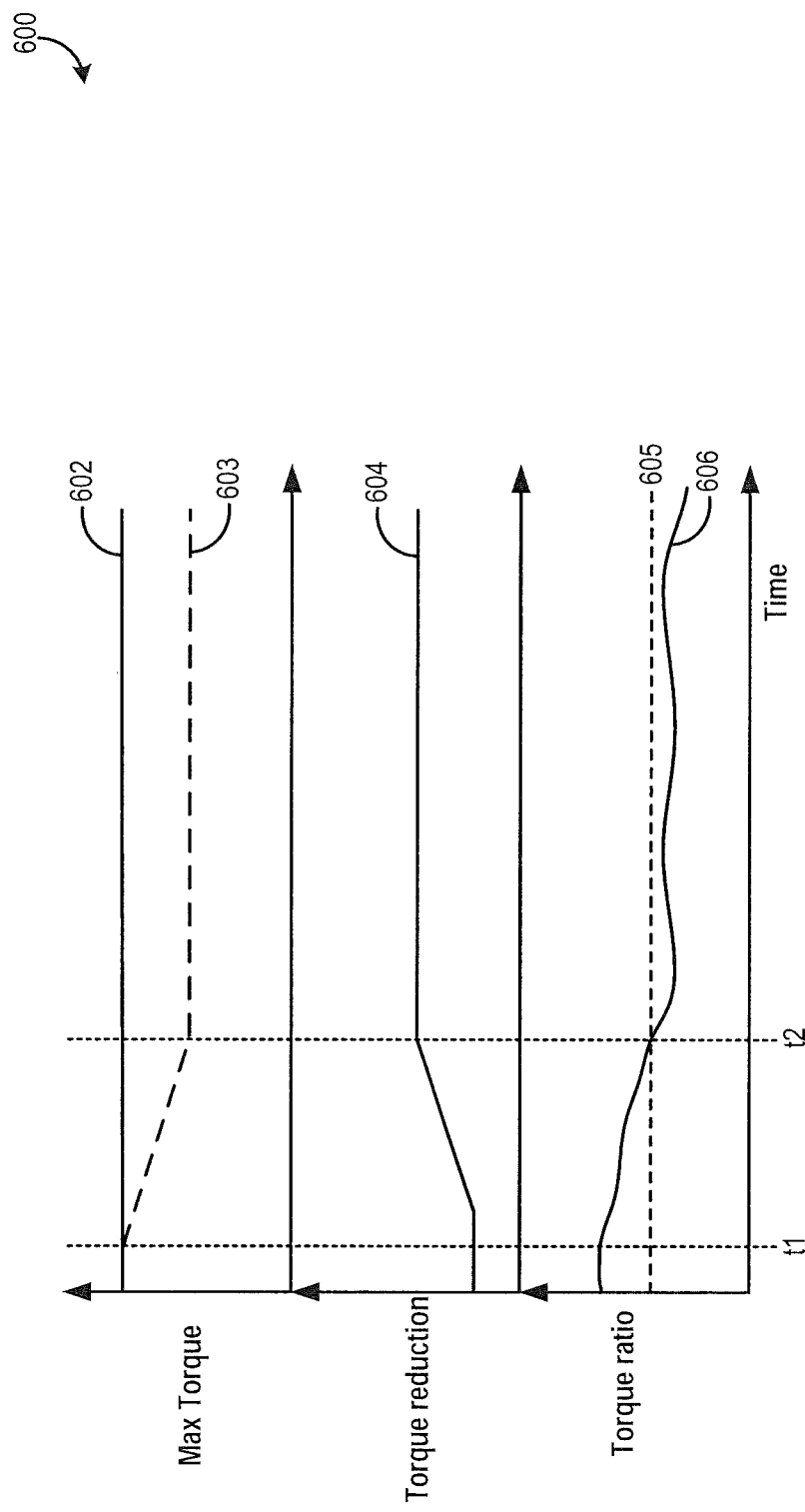
FIG. 6 shows an example learning of the maximum torque for best fuel economy.
Figure 7:
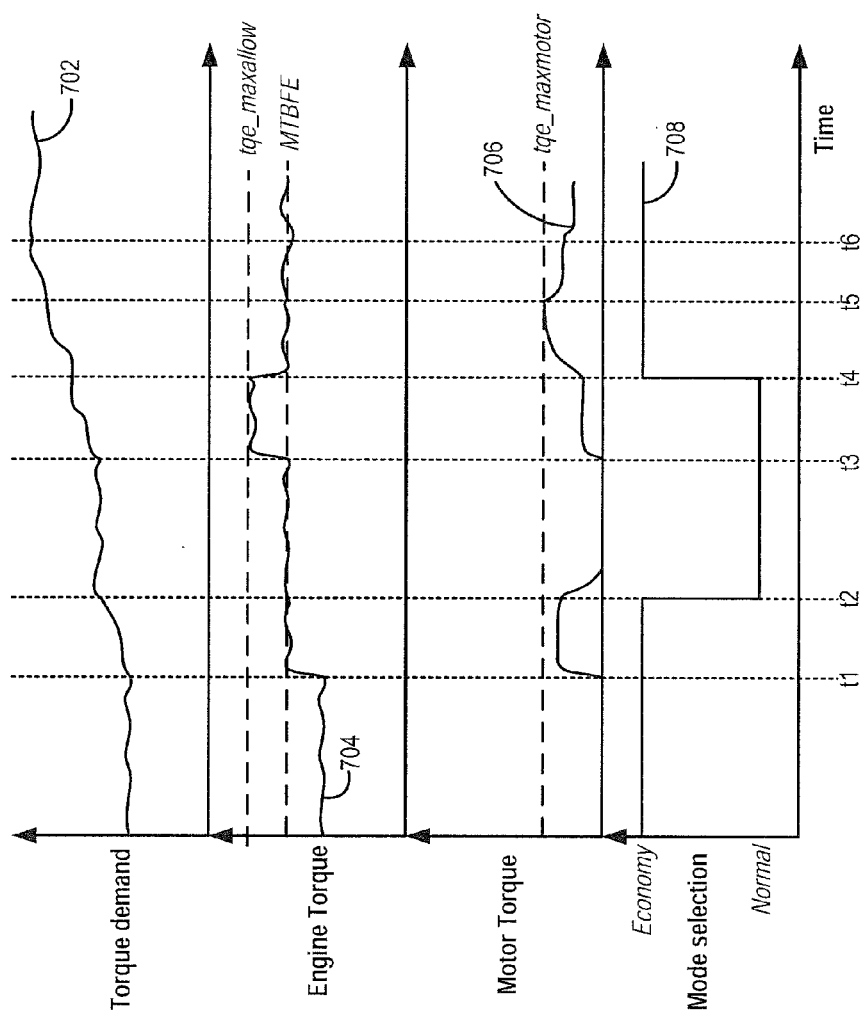
FIG. 7 shows an example change in engine torque and torque adjustment value, according to the presence disclosure.

Methods and systems are provided for dynamically adjusting a maximum engine torque available in a hybrid electric vehicle, such as the vehicle system of FIGS. 1-2. Based on whether an operator has selected a performance mode or an economy mode of vehicle operation, and further based on steady-state or transient conditions (FIG. 5), a limiting of the maximum engine torque may be varied. A controller may be configured to perform a control routine, such as the routine of FIG. 3 to apply a more constrained maximum torque more when operating in an economy mode or in the presence of steady-state conditions when operating in a performance mode to achieve higher fuel economy. In comparison, the controller may apply a less constrained maximum torque in the presence of transients when operating in the performance mode to achieve improved vehicle acceleration. The controller may also perform a routine, such as the example routine of FIG. 4, to learn the value of the more constrained maximum torque for best fuel economy at each engine speed range based on a spark retard torque ratio. An example learning is shown at FIG. 6. An example dynamic torque allocation between engine torque and motor torque based on the applied maximum available engine torque is shown at FIG. 7. In this way, an improve balance of vehicle fuel economy and performance is achieved.

The present disclosure may be directed to vehicles that include two or more different power sources, such as hybrid electric vehicles (HEVs). FIG. 1 demonstrates one possible configuration for an HEV, specifically a parallel/series hybrid electric vehicle (split) configuration. However, various other hybrid configurations may be used, such as series, parallel, integrated starter/alternator, etc.

In an HEV, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine speed can be controlled by varying the split to the series path while maintaining the mechanical connection through the parallel path. The traction motor 38 augments the engine power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine energy, minus conversion losses, to reach the drive wheels 42.

A vehicle system controller (VSC) 46 controls many components in this HEV configuration by connecting to each component's controller. An engine control unit (ECU) 48 connects to the Engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardware interface. The TMU 49 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

The vehicle may further include one or more buttons for receiving inputs from a vehicle operator. For example, a button 68 may be configured on a dashboard or central console of the vehicle for receiving an input regarding an operator's vehicle performance mode selection. In one example, as elaborated with reference to FIG. 3, button 68 may be referred to as an "Eco" button wherein by actuating or pressing the button, the vehicle operator may indicate a desire to operate the vehicle in a fuel economy mode. Accordingly, various vehicle operating parameters, including a dynamic allocation of drive torque and constraining of engine maximum available torque, may be adjusted to reduce the use of spark retard and improve overall fuel economy. When the button is not actuated, a default normal or high performance mode may be selected by default. When the normal mode is selected, the various vehicle operating parameters, including the dynamic allocation of drive torque and the constraining of engine maximum available torque, may be adjusted to reduce knock limits by using of spark retard and improve vehicle peak torque outputs and acceleration rates at any given engine speed.

It should be appreciated that FIG. 1 only demonstrates one configuration of an HEV. However, various vehicle types having an auxiliary power source may be used. For example, the present disclosure may be useful in a fuel cell HEV, a gasoline HEV, an ethanol HEV, a flexfuel HEV, a hydrogen engine HEV, etc.

FIG. 2 shows an example engine 24 and exhaust system that may be used with the HEV system illustrated in FIG. 1. Internal combustion engine 24, comprising a plurality of cylinders, one cylinder of which is shown in FIG. 2, is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valve actuators for valves 52 and 54 has a position sensor and a temperature sensor. In an alternative embodiment, cam actuated valves may be used with or without variable cam timing or variable valve lift.

Intake manifold 43 is also shown having fuel injector 65 coupled thereto for delivering liquid fuel in proportion to the pulse width of signal FPW from controller 48. Fuel is delivered to fuel injector 65 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 43 is shown communicating with optional electronic throttle 125.

Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to exhaust manifold 47 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof. Converter 70 can include multiple catalyst bricks, in one example. In another example, multiple emission control devices, each with multiple bricks, can be used. Converter 70 can be a three-way type catalyst in one example.

Controller 48 is shown in FIG. 2 as a conventional microcomputer including: microprocessor unit (CPU) 102, input/output ports 104, read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 43; a measurement (ACT) of engine air amount temperature or manifold temperature from temperature sensor 117; and an engine position sensor from a Hall effect sensor 118 sensing crankshaft 39 position. In one aspect of the present description, engine position sensor 118 produces a predetermined number of equally spaced pulses every revolution of the crankshaft from which engine speed (RPM) can be determined.

In an alternative embodiment, a direct injection type engine can be used where injector 65 is positioned in combustion chamber 29, either in the cylinder head similar to spark plug 92, or on the side of the combustion chamber.

Figure 3:
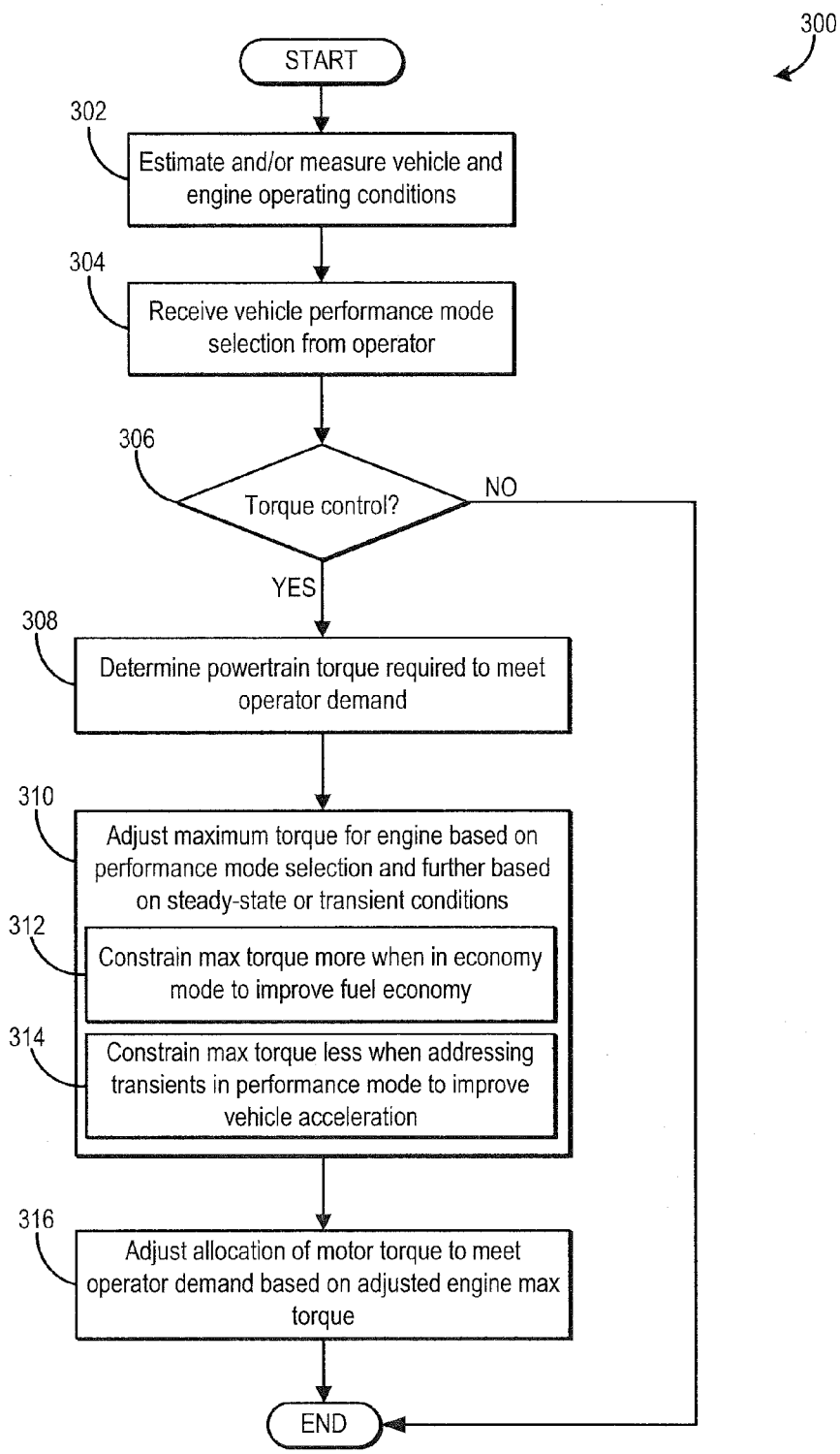
FIG. 3 shows a high level flowchart for allocating a requested drive torque among an engine and an electric motor to meet an operator demand.

Now turning to FIG. 3, an example routine 300 is shown for allocating a requested drive torque amount an engine and an electric motor of a hybrid electric vehicle to meet an operator demand. The routine dynamically limits a maximum allowable engine torque based on operating conditions so as to balance fuel economy and vehicle performance.

At 302, vehicle and engine operating conditions may be estimated and/or measured. These include, for example, engine speed, torque demand, engine load, battery state of charge, vehicle speed, engine temperature, battery age, intake manifold vacuum level, brake booster vacuum level, etc.

At 304, the routine includes receiving a vehicle performance mode selection from an operator. The operator selected vehicle performance mode may include one of a first, normal mode, where vehicle performance is prioritized, and a second economy mode where fuel economy is prioritized. As such, in the first mode, attaining peak engine output and a target acceleration rate is of priority, even if it comes at the cost of lower fuel economy (due to the engine operating in a knock-limited zone and needing spark retard to address the knock). In comparison, in the second mode, improving fuel economy is of priority, even if it comes at the cost of less-than-peak engine output and less-than-target acceleration rates. The operator may select one of the first normal mode and the second economy mode by actuating or pressing a button coupled to a vehicle console, or a vehicle dashboard. As such, the operator may also press the button at any time during vehicle operation (such as during a vehicle maneuver) to change the performance mode selection. As an example, the operator may press an eco-button on the vehicle dashboard to select the fuel economy mode. If the eco-button is not selected, the normal performance mode may be selected by default.

After receiving the operator selection, at 306, it may be determined if torque control is commanded. In one example, torque control may be commanded responsive to a change (e.g., increase or decrease) in operator torque demand. The change in torque demand may include a rate of change in torque demand and/or an absolute amount of change in torque demand. In one example, the controller may be estimate a rate of change in torque demand based on a change in pedal position (e.g., of an accelerator pedal). The estimate rate of change in torque demand may be indicative of steady-state or transient operating conditions. For example, a higher rate of change in torque demand (e.g., higher than a threshold) may indicate transient conditions while a lower rate of change in torque demand (e.g., lower than a threshold) may indicate steady-state conditions. If torque control is not required, the routine may end.

If torque control is commanded, then at 308, the routine determines a powertrain torque required to meet the operator demand. As used herein, the powertrain torque refers to a total drive torque required (as a combination of engine torque and motor torque) to drive the vehicle and meet the operator demand.

At 310, the routine includes dynamically limiting a maximum available torque for the engine based on each of the operator selected vehicle performance mode (e.g., first normal performance mode or second economy performance mode) and the change in torque demand. Specifically, the maximum available torque may be limited between a first torque limit based on performance and a second torque limit based on fuel economy. Herein, the second torque limit may be more constrained than the first torque limit and may therefore correspond to a lower maximum engine torque limit than the first limit. The second torque limit may be further based on engine vacuum demands (e.g., based on engine torque required to provide sufficient intake manifold vacuum for canister purging and brake booster vacuum needs). The controller may select between the first and second maximum available engine torque limit based on the vehicle performance mode selection and the estimated rate of change in torque demand to adjust the dynamic allocation of engine torque and motor torque so as to either improve vehicle performance (e.g., improve vehicle peak torque and acceleration rates) or improve fuel economy.

As elaborated with reference to FIGS. 5-6, the second torque limit that is based on fuel economy may be learned based on a spark retard torque ratio at or near a maximum available torque. Therein, the engine may be set to initially operate at an unconstrained maximum available torque (that is, the first limit), which may include some spark retard from MBT. The controller may then move spark timing towards MBT and note a change in the spark retard torque ratio relative to a threshold. The second torque limit is then adjusted with relation to the first torque limit based on a deviation of the spark retard torque ratio from the threshold or target torque ratio.

The inventors herein have recognized that dynamometer mapping cell data is usually the only information available to determine the maximum available torque at which the engine can perform with peak efficiency. However, the efficiency of the engine at that maximum torque may diminish greatly under real-world conditions such as low octane fuel, high temperature, and altitude. This is largely due to the need for retarding spark to suppress engine knock, which incurs a fuel penalty. Avoiding all conditions where knock may exist may place a very large penalty on available engine power and may add costs by requiring more battery power to fill in the deficit in torque. The problem is exacerbated in hybrids where limited engine torque and limited motor torque is available. Thus by constraining the maximum available torque limit based on the mode selection and further based on whether transient or steady state conditions exist, a better balance between performance and fuel economy can be struck, while minimizing the reduction in performance when fuel economy is the higher priority.

Returning to FIG. 3, adjusting the maximum engine torque limit may include, at 312, constraining the maximum engine torque limit more when in the fuel economy mode to improve fuel economy. The adjusting may further include, at 314, constraining the maximum engine torque limit less when addressing transients in the normal performance mode so as to improve vehicle acceleration. For example, when operating in the second economy mode, irrespective of whether the torque change corresponds to steady-state or transient conditions, the second, lower maximum torque limit may be selected. As another example, when operating in the first normal performance mode, the routine may select the second limit in response to a lower rate of change in torque demand (steady-state conditions). As yet another example, when operating in the first normal performance mode, the routine may select the first limit in response to a higher rate of change in torque demand (transient conditions).

By using the second, lower maximum torque limit when operating in the economy mode, fuel economy is prioritized. Specifically, use of spark retard is minimized even if peak engine outputs are reduced. Likewise, by using the second, lower maximum torque limit when operating in the performance mode, during steady-state conditions where vehicle acceleration is not required, fuel economy is prioritized. In comparison, the first, higher maximum torque limit is applied when operating in the normal performance mode in the presence of transients, where vehicle acceleration and peak performance is required. Herein, the transient need for engine spark retard (and the resulting fuel penalty) is tolerated to meet the transient increase in torque demand and enable rapid vehicle acceleration.

After dynamically adjusting the maximum engine torque limit, at 316, the routine includes providing motor torque to the vehicle based on the dynamic limiting of engine torque. Specifically, a motor torque provided may be adjusted based on the selected engine torque limit so as to meet the operator demand. In one example, such as during transient conditions, this is may include increasing the motor torque up to a maximum motor torque limit.

As such, the operator may change a performance mode selection during vehicle operation by pressing a button during a transient vehicle maneuver. For example, the operator may select the second economy mode during transient conditions while operating in the first performance mode. Responsive to this change in selection, the controller may reduce the maximum available torque from the first torque limit to the second torque limit, and correspondingly increase motor torque from a vehicle battery to maximum motor torque.

In still further embodiments, the torque limit applied when operating in the second economy mode, in the presence of transient conditions, may be adjusted based on the motor torque requirement. For example, during transient conditions when operating in the second economy mode, in response to the motor torque provided being at maximum motor torque, the controller may automatically shift the maximum torque limit from the second torque limit to the first torque limit. Herein, the maximum engine torque may be automatically returned to the unconstrained limit in view of the transient increase in torque demand and the inability of the motor to provide any further motor torque (since the motor torque is already at maximum torque). Optionally, a failure mode or motor over-temperature condition may be indicated as the cause, otherwise, the maximum torque clip would be regularly defeated in the economy mode.

FIG. 5 shows an example table 500 depicting the maximum torque applied during steady-state or transient conditions, when operating in difference performance modes. In one example, table 500 may be stored in the memory of the vehicle controller and may be used by the controller to select the appropriate maximum torque limit when performing routine 300.

As shown at table 500, the controller may select the first, unconstrained maximum engine torque limit in response to the first performance mode being selected and the estimated rate of change in torque being indicative of transient conditions. In comparison, the controller may select the second limit in response to one of the first performance mode being selected and the estimated rate of change in torque being indicative of steady-state conditions, and the second economy mode being selected and the estimated rate of change in torque indicative of steady-state or transient conditions.

In some embodiments, the limits applied in the presence of transients during the economy mode may be further adjusted based on the motor torque relative to a maximum motor torque. For example, if operating in the second economy mode during transient conditions, and further if maximum motor torque is reached, the constraining of the maximum available engine torque is discontinued and the unconstrained maximum available engine torque is applied.

For example, the hybrid vehicle system may comprise an electric motor coupled to a battery, an engine, vehicle wheels configured to receive engine torque from the engine and motor torque from the motor, a vehicle console for receiving one or more inputs from a vehicle operator and a controller configured to operate the vehicle in various operating modes based on the operator selection and the change in torque demand. As an example, the controller may operate the vehicle in a first mode with maximum engine torque more constrained during steady-state operating conditions when the operator input is indicative of performance requirement. The controller may then operate the vehicle in a second mode with maximum engine torque less constrained during transient operating conditions when the operator input is indicative of the performance requirement. The controller may further operate the vehicle in a third mode with maximum engine torque more constrained during steady-state operating conditions when the operator input is indicative of fuel economy requirement. The controller may also operate the vehicle in a fourth mode with maximum engine torque more constrained during transient operating conditions when the operator input is indicative of fuel economy requirement and the electric motor is operating below maximum motor torque output, while operating the vehicle in a fifth mode with maximum engine torque less constrained during transient operating conditions when the operator input is indicative of fuel economy requirement and the electric motor is operating in a limited operating mode at maximum motor torque output.

Further, in response to an operator input indicative of fuel economy requirement received while operating the vehicle in the second mode, the controller may constrain the maximum engine torque and increase the motor torque to meet the operator torque demand. Herein, limiting the maximum engine torque includes reducing the maximum engine torque by an amount to move a spark retard torque ratio to a threshold torque ratio. Further, increasing the motor torque includes increasing the motor torque to a maximum motor torque limit with engine torque maintained at the limited maximum engine torque, and then maintaining the motor torque at the maximum motor torque limit and reducing the torque delivered to the wheels when in the fuel economy mode.

Figure 4:
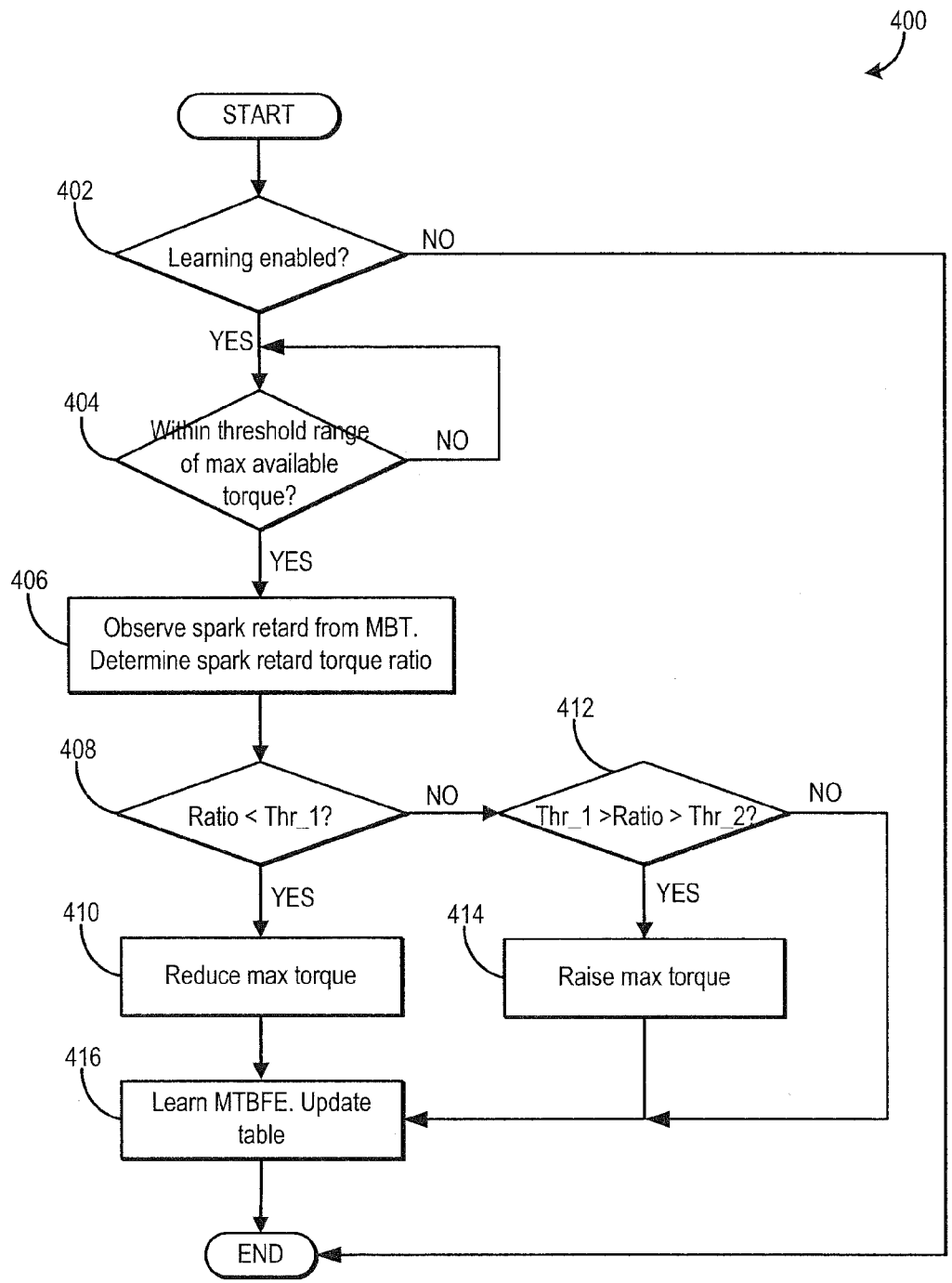
FIG. 4 shows a high level flowchart for learning the maximum available torque for best fuel economy based on a spark retard ratio.

Now turning to FIG. 4, an example routine 400 for learning how to dynamically limit the maximum available engine torque is shown. A maximum engine torque limit is learned based on a spark retard torque ratio at or near maximum available torque during selected operating conditions. The routine allows the maximum available engine torque to be learned up or down, as spark timing is moved towards MBT, based on a resulting change in torque ratio.

At 402, it may be determined if learning has been enabled. In one example, learning may be enabled when the engine is operating at wide-open throttle conditions if no spark retard had been observed or if no learning has yet occurred. If learning is not enabled, the routine may end.

Upon confirming that learning is enabled, at 404 the routine includes confirming that engine torque is within a threshold range of maximum available torque. For example, it may be determined that the engine is operating with engine maximum available torque set to the first unconstrained limit.

Upon confirmation, at 406, the routine moves spark timing towards MBT and determines the change in spark retard torque ratio (or TR). As such, the spark retard torque ratio corresponds to a ratio of torque at borderline spark compared to torque at MBT spark. At 408, it may be determined if the spark retard torque ratio is lower than a first threshold (Thr_1). In one example, the first threshold is a torque ratio of 0.98. If the first threshold is not met, it may be determined that there is more spark retard than desired, and therefore a drop in fuel economy. Accordingly, at 410, when the spark retard torque ratio is below the first threshold, the maximum torque limit is decreased, or learned down. For example, a second more constrained torque limit is learned which is decreased relative to the first unconstrained torque limit as the spark retard torque ratio falls below the first threshold. At 416, the updated second torque limit (or max torque for best fuel economy, MTBFE) is learned for the given engine speed range and a maximum engine torque table stored in the controller's KAM is updated.

It will be appreciated that the first threshold may be varied as function of the engine speed range at which the learning is performed. This is because torque ratio accuracy can vary with RPM. As an example, at higher engine speed ranges, a higher first torque ratio threshold may be applied while at lower engine speed ranges, a lower first torque ratio threshold may be applied.

If the first threshold torque ratio is exceeded, then at 412, it may be determined if the spark retard torque ratio is lower than a second threshold (Thr_2). In one example, the second threshold is a torque ratio of 0.95. If the spark retard torque ratio falls below the second threshold, it may be determined that there may be a drop in vehicle performance. Accordingly, at 414, when the spark retard torque ratio falls below the second threshold, the maximum torque limit is increased, or learned up. For example, a second more constrained torque limit is learned which is increased towards the first unconstrained torque limit as the spark retard torque ratio falls below the first threshold. Next, at 416, the updated second torque limit (or max torque for best fuel economy, MTBFE) is learned for the given engine speed range and a maximum engine torque table stored in the controller's KAM is updated.

It will be appreciated that the second threshold may also be varied as function of the engine speed range at which the learning is performed. As an example, at higher engine speed ranges, a higher second torque ratio threshold may be applied while at lower engine speed ranges, a lower second torque ratio threshold may be applied. As such, the higher/lower second torque ratio selection may also give more improvement at low engine speeds where more driving is done and peak power is less critical.

If the spark retard ratio at 408 and 412 is between the first and second threshold, that is, in the desired range, the routine proceeds directly to 416 to learn the MTBFE and update the maximum engine torque table.

In this way, a learning method that always extracts the most torque from the engine without entering an inefficient state is used to dynamically adjust the maximum engine torque limit. By observing the spark retard torque ratio (TR_SPK_EXIST) when near the maximum available torque, the value of maximum available torque for best fuel economy (MTBFE) can be learned. When operating near MTBFE, the presence of spark retard TR below the first threshold (i.e. below 0.98 TR) causes the value MTBFE to be decreased slightly until no spark retard occurs. This learned value of MTBFE is then used until the spark retard TR at MTBFE is observed to be more than a second, lower threshold (below 0.95 TR), at which point the MTBFE is increased slightly until the first threshold is reached (0.98 TR). In this way, changing environmental and engine conditions are accounted for and the best available engine torque is available for performance while still delivering best fuel economy. This allows a more aggressive use of the engine and a smaller, less costly battery to achieve equivalent vehicle performance.

In one example, if the requested torque is within +/-2 Nm of MTBFE for 1.5 seconds and the spark retard torque ratio is less than a first threshold (0.98 TR), then the max torque limit (MTBFE) may be decreased slightly by increasing the amount of torque reduction applied (tqe_bfe_KAM). Else, if the spark retard torque ratio is greater than the first threshold and a hysteresis factor (0.95 TR), then the max torque limit (MTBFE) may be increased slightly by decreasing the amount of torque reduction learned (tqe_bfe_KAM). If the spark retard ratio is within the desired torque ratio range, the learned value of MTBFE is left as is, and not updated until the requested torque is once again near MTBFE.

In this way, by constantly adjusting the maximum available engine torque to learn the torque value where spark starts to retard from MBT, the highest maximum torque with best fuel economy (herein also referred to as MTBFE) can be found and stored for each RPM range.

An example learning is now shown with reference to FIG. 6. Specifically, map 600 depicts the maximum available engine torque at plots 602-603, torque reduction at plot 604, and a spark retard torque ratio at plot 606.

Prior to t1, the engine may be operating with borderline spark (BDL). While this may be an inefficient state from a fuel economy point of view, it may be a setting where the maximum available engine torque can be provided. The maximum available torque available before t1 is therefore a higher, unconstrained torque limit, depicted here by plot 602 (solid line). In the depicted example, the unconstrained maximum available torque available prior to t1 is 160 Nm. At the borderline spark setting, the torque ratio (plot 604, indicative of whether spark retard exists or not) is above threshold 605 (dashed line). As such, at this time, no torque reduction is being learned (plot 604).

At t1, learning of the maximum torque is enabled. Specifically, spark timing is moved from BDL towards MBT which results in a drop in torque ratio. As the spark timing is moved away from BDL, fuel economy is improved due to the reduction in spark retard usage, however, there is also a corresponding reduction in the maximum available torque, depicted at plot 604. In particular, the maximum available engine torque is gradually limited relative to the unconstrained maximum available engine torque to learn a maximum available engine torque that is best for fuel economy (MTBFE). In the depicted example, the constrained maximum available torque limit for fuel economy is 120 Nm and a torque reduction of 40 Nm is learned. The constrained MTBFE (plot 603, dashed line) is thus learned down relative to the unconstrained maximum available engine torque (plot 602, solid line) based on a deviation of the spark retard torque ratio relative to the threshold torque ratio as spark timing is moved towards MBT.

At t2, the spark timing may be moved to a position where the torque ratio falls below threshold 605 (e.g., 0.98 TR). As such, beyond this point, fuel economy benefits from further torque reduction do not outweigh the performance reduction penalty. Thus, at t2, no further spark timing change in performed, and the maximum available engine torque for best fuel economy is learned as a function of the current engine speed range.

It will be appreciated that while FIG. 6 shows an example of maximum available engine torque for best fuel economy being learned down from the unconstrained torque limit to achieve MBT spark timing, in alternate examples, the MTBFE can also be learned up. For example, threshold 605 may be a first upper threshold (e.g., 0.98 TR) and MTBFE may be learned down until the spark retard torque ratio is below the first threshold, while MTBFE may be learned up until the spark retard torque ratio is above a second, lower threshold (e.g., 0.95 TR). It will also be appreciated that the depicted learning is for a given engine speed range and MTBFE values may be likewise learned up or down for difference engine speed ranges. The learned MTBFE values may then be stored in a look-up table in the controller's memory (e.g., in the KAM) as a function of engine speed range and further in relation to the unconstrained maximum available torque at that engine speed range. The unconstrained torque limit may then be used when operating in that engine speed range in a normal performance mode under transient conditions. The constrained torque limit may be used when operating in that engine speed range in the normal performance mode under steady-state conditions, or in the economy performance mode under transient and steady-state conditions.

Now turning to FIG. 7, an example dynamic adjusting of the maximum available engine torque and the dynamic allocation of drive torque between an engine and an electric motor of a hybrid vehicle is shown. Specifically, map 700 depicts operator torque demand at plot 702, engine torque allocation at plot 704, including changes in the maximum available torque limit at plot 705, motor torque allocation at plot 706, and operator performance mode selection at plot 708.

Prior to t1, an operator may have pressed an "Eco" button on the vehicle's dashboard indicating a desired to operate the vehicle with fuel economy as a priority (plot 708). To provide the desired fuel economy, the maximum available engine torque may be limited to a lower value (MTBFE). Between t0 and t1, while operating the economy mode, the torque demand may reflect steady-state conditions (plot 702). Accordingly, engine torque allocated to meet the drive torque is adjusted to meet the demand (plot 704). In the example, due to the torque demand being a value that can be provided by the engine while operating within the constrained limit, no additional motor torque allocation is required (plot 706). Thus, driver demand is met while maintaining good fuel economy.

At t1, the torque demand may change, for example due to an operator pedal tip-in, and may reflect transient conditions. Herein, the torque limit may remain at MTBFE but to meet the increased drive torque demand, engine output may be shifted to MTBFE while a remaining torque demand is met by increasing allocation of motor torque. Herein, the desired vehicle acceleration is achieved while also meeting the fuel economy need.

At t2, steady-state conditions may resume and the operator may release the Eco button indicating a desire to shift to a normal performance mode and prioritize vehicle performance over fuel economy. However, due to the presence of steady-state conditions, the maximum torque may be maintained at MTBFE to provide additional fuel economy benefits. Between t2 and t3, due to the torque demand being a value that can be provided by the engine while operating within the constrained limit, no additional motor torque allocation is required (plot 706).

At t3, the torque demand may change, for example due to another operator pedal tip-in, and may reflect transient conditions. Herein, due to the normal performance mode being selected, the maximum available torque may be shifted to a higher, unconstrained value (tqe_maxallow). This allows the peak torque output by the engine to be increased, even if a fuel penalty is incurred (due to the need to operate at borderline spark transiently). As a result, the driver demand can be met and the desired vehicle acceleration is achieved. A motor torque allocation is adjusted based on the driver demand and the engine torque allocation.

At t4, while operating with transients, the operator may press the Eco button to reprioritize fuel economy. In response to the change in performance mode to fuel economy during the transient operating conditions, the maximum torque is shifted down to the constrained limit MTBFE and the motor torque allocation is increased to meet the driver demand. As such, the motor torque allocation between t4 and t5 may be within a maximum available motor torque output and therefore the combination of motor torque and peak engine torque can be used to meet the driver demand.

At t5, the motor torque output may reach the maximum motor torque limit and no further motor torque may be provided by the motor (e.g., due to the prevalent battery state of charge). Herein, due to the motor torque reaching the limit, the engine torque is maintained at the constrained limit (MTBFE) while the motor torque is maintained at the motor torque limit. As a result, the delivered torque at t5 through t6 may be reduced (that is, lower than the demanded torque). The reduced torque may continue to be delivered until the Eco button is unselected and the vehicle is returned to the performance mode, or until the engine returns to steady-state conditions, such as at t6.

During some selected conditions, such as during failure mode conditions, in response to the motor torque reaching the maximum torque limit, the maximum available engine torque may be returned to the unconstrained limit, allowing the peak engine performance to be increased in view of the increased driver demand while the motor torque is at its limit. Alternatively, the maximum engine torque limit may be returned to the unconstrained limit in response to a motor over-temperature condition. However, since the maximum torque clip would defeat the fuel economy benefit of operating in the Economy mode, such a maneuver may be considered only under failure mode conditions.

At t6, steady-state conditions may resume and the maximum available torque limit may be returned to the lower MTBFE level. In addition, the reduced driver torque demand can be met by the engine and motor torque allocation may be reduced.

It will be appreciated that in the given example, the engine torque limits are depicted for a given engine speed range. As such, if the engine speed range changes based on engine operating conditions, the maximum engine torque limits may further vary based on the engine speed range.

In this way, a better balance may be achieved between fuel economy and vehicle performance even in an economy mode of vehicle operation. By dynamically limiting the maximum available engine torque during selected conditions where fuel economy is a priority, fuel usage is improved. By learning the limiting based on torque reduction from an unconstrained maximum available torque limit as spark timing is moved towards MBT, a more aggressive use of the engine is achieved. This improves vehicle performance while still delivering the best fuel economy.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid electric vehicle, comprising:
dynamically limiting a maximum available engine torque based on each of an operator selected vehicle performance mode and a change in torque demand, the limiting includes selecting the maximum available torque limited between a first engine torque limit based on performance and a second engine torque limit based on fuel economy; and
providing motor torque to the vehicle based on the dynamic limiting of engine torque.

2. The method of claim 1, wherein the second engine torque limit corresponds to a lower maximum available engine torque than the first engine torque limit.

3. The method of claim 1, wherein the second engine torque limit is further based on engine vacuum demand.

4. The method of claim 1, wherein the second engine torque limit based on fuel economy is learned relative to the first engine torque limit based on a spark retard torque ratio at or near the maximum available engine torque.

5. The method of claim 4, wherein the second engine torque limit is decreased from the first engine torque limit when the spark retard torque ratio exceeds a first threshold and wherein the second engine torque limit is increased towards the first engine torque limit when the spark retard torque ratio falls below a second threshold, the second threshold lower than the first threshold.

6. The method of claim 1, wherein the operator selected vehicle performance mode includes one of a first normal mode where vehicle performance is prioritized and a second economy mode where fuel economy is prioritized.

7. The method of claim 6, wherein an operator selects one of the first normal mode and the second economy mode by pressing a button coupled to a vehicle console.

8. The method of claim 7, wherein dynamically limiting based on the change in torque demand includes dynamically limiting based on a rate of change in torque demand.

9. The method of claim 8, wherein the adjusting includes, in response to a lower rate of change in torque demand when operating in the first normal mode, selecting the second engine torque limit, in response to a higher rate of change in torque demand when operating in the first normal mode, selecting the first engine torque limit, and when operating in the second economy mode, selecting the second engine torque limit.

10. The method of claim 9, wherein the lower rate of change in torque demand includes steady-state conditions and wherein the higher rate of change in torque demand includes transient conditions.

11. The method of claim 10, further comprising, in response to the operator selecting the second economy mode during transient conditions while operating in the first performance mode, reducing the maximum available engine torque from the first engine torque limit to the second engine torque limit, and increasing motor torque from a vehicle battery to maximum motor torque.

12. The method of claim 9, further comprising, during transient conditions when operating in the second economy mode, in response to the motor torque provided being at maximum motor torque, automatically shifting a maximum torque limit from the second engine torque limit to the first engine torque limit and indicating a failure mode.

13. A method for a hybrid vehicle, comprising:
receiving a vehicle performance mode selection from an operator;
estimating a rate of change in operator torque demand based on a pedal position;
selecting between a first and second maximum available engine torque limit based on each of the vehicle performance mode selection and the estimated rate of change in operator torque demand; and
adjusting a motor torque based on the selected torque limit to meet the operator torque demand.

14. The method of claim 13, wherein receiving the vehicle performance mode selection from the operator includes the operator pressing a button coupled to a dashboard of the vehicle to select either a first, normal performance mode wherein torque output is prioritized or a second, economy mode wherein fuel economy is prioritized.

15. The method of claim 14, wherein the second limit corresponds to a lower maximum available engine torque than the first limit, and wherein the selecting includes:

selecting the second limit in response to one of the first performance mode being selected and the estimated rate of change in operator torque demand being indicative of steady-state conditions, and the second economy mode being selected and the estimated rate of change in operator torque demand indicative of steady-state or transient conditions; and selecting the first limit in response to the first performance mode being selected and the estimated rate of change in operator torque demand being indicative of transient conditions.

16. The method of claim 15, further comprising, learning a deviation of the second limit from the first limit based on a deviation of a spark retard torque ratio from a threshold torque ratio as spark timing is moved towards MBT.

17. A hybrid vehicle system, comprising:
an electric motor coupled to a battery;
an engine;
vehicle wheels configured to receive engine torque from the engine and motor torque from the motor;
a vehicle console for receiving one or more inputs from a vehicle operator; and
a controller with computer readable instructions for:
operating the vehicle in a first mode with maximum engine torque more constrained during steady-state operating conditions when the operator input is indicative of performance requirement;
operating the vehicle in a second mode with maximum engine torque less constrained during transient operating conditions when the operator input is indicative of the performance requirement;
operating the vehicle in a third mode with maximum engine torque more constrained during steady-state operating conditions when the operator input is indicative of fuel economy requirement;
operating the vehicle in a fourth mode with maximum engine torque more constrained during transient operating conditions when the operator input is indicative of fuel economy requirement and the electric motor is operating below maximum motor torque output; and
operating the vehicle in a fifth mode with maximum engine torque less constrained during transient operating conditions when the operator input is indicative of fuel economy requirement and the electric motor is operating at maximum motor torque output.

18. The system of claim 17, wherein the controller includes further instructions for, in response to the operator input indicative of fuel economy requirement received while operating the vehicle in the second mode, constraining the maximum engine torque and increasing the motor torque to meet an operator torque demand.

19. The system of claim 18, wherein limiting the maximum engine torque includes reducing the maximum engine torque by an amount to move a spark retard torque ratio to a threshold torque ratio.

20. The system of claim 19, wherein increasing the motor torque includes increasing the motor torque to a maximum motor torque limit with engine torque maintained at the limited maximum engine torque, and thereafter maintaining the motor torque at the maximum motor torque limit with the maximum engine torque more constrained while reducing total drive torque delivered to the vehicle wheels.

* * * * *